United States Patent
Shouda et al.

(10) Patent No.: US 7,243,487 B2
(45) Date of Patent: Jul. 17, 2007

(54) CONTROL APPARATUS FOR INTERNAL COMBUSTION ENGINE

(75) Inventors: Tomohisa Shouda, Tokyo (JP); Keiichi Enoki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 246 days.

(21) Appl. No.: 11/005,009

(22) Filed: Dec. 7, 2004

(65) Prior Publication Data

US 2005/0262831 A1     Dec. 1, 2005

(30) Foreign Application Priority Data

May 25, 2004   (JP)   ............... 2004-154745

(51) Int. Cl.
*F01N 3/00* (2006.01)

(52) U.S. Cl. .................. 60/285; 60/276; 60/277

(58) Field of Classification Search ............ 60/276, 60/277, 285, 299
See application file for complete search history.

(56) References Cited

U.S. PATENT DOCUMENTS

| | | | | |
|---|---|---|---|---|
| 5,191,762 A | * | 3/1993 | Kuroda et al. ............ | 60/276 |
| 6,148,611 A | * | 11/2000 | Sato ........................ | 60/274 |
| 6,226,982 B1 | * | 5/2001 | Poggio et al. ............. | 60/276 |
| 6,560,960 B2 | * | 5/2003 | Nishimura et al. ........ | 60/284 |
| 6,751,950 B2 | * | 6/2004 | Ikemoto et al. ........... | 60/285 |
| 6,760,658 B2 | * | 7/2004 | Yasui et al. .............. | 701/106 |
| 6,837,232 B2 | * | 1/2005 | Yamashita ............... | 123/694 |
| 6,880,329 B2 | * | 4/2005 | Iida et al. ................. | 60/285 |

FOREIGN PATENT DOCUMENTS

JP     5-26076 A     2/1993

* cited by examiner

*Primary Examiner*—Thomas Denion
*Assistant Examiner*—Diem Tran
(74) *Attorney, Agent, or Firm*—Sughrue Mion, PLLC

(57) ABSTRACT

A control apparatus for the internal combustion engine includes a fuel cut post-return fuel increasing correction unit for performing a fuel increasing correction during a specified period when a fuel supply stop state by an fuel cut control unit is returned to a fuel supply state, and a fuel increasing correction stop unit which compares an integrated value of an amount of air flowing into a three-way catalyst during a period of the fuel supply stop with an integrated value of an amount of air flowing into the three-way catalyst during the fuel increasing correction after a fuel supply return, and stops the fuel increasing correction of the fuel cut post-return fuel increasing correction unit when a comparison value reaches a specified value.

2 Claims, 6 Drawing Sheets

CONTROL APPARATUS FOR INTERNAL COMBUSTION ENGINE

BACKGROUND OF THE INVENTION

1. Field of the Invention

The present invention relates to a control apparatus for an internal combustion engine, which prevents, in an internal combustion engine performing a fuel cut control at the time of deceleration of a vehicle or the like, an exhaust gas from deteriorating after a return from the fuel cut.

2. Description of the Related Art

A three-way catalyst used for purifying an exhaust gas of an internal combustion engine oxidizes or reduces hydrocarbon, carbon monoxide, and nitrogen oxide as harmful components in the exhaust gas under stoichiometric atmosphere and converts them into harmless components, and further has such properties as to store oxygen when the oxygen used at the time of oxidation or reduction is excessive and as to release the stored oxygen when it is insufficient. When the internal combustion engine carries out fuel cut, since fuel is not supplied, and combustion in a cylinder is not performed, a large amount of oxygen is introduced into an exhaust system of the internal combustion engine, and the oxygen is stored in the three-way catalyst provided in the exhaust system. Thus, after a return from the fuel cut control, a difference occurs between the oxygen concentration at the upstream side of the three-way catalyst and the oxygen concentration in the actual three-way catalyst.

In the state as stated above, even if feedback control of an air-fuel ratio is performed to purify the exhaust gas, oxygen becomes excessive by the oxygen stored in the three-way catalyst, the air-fuel ratio can not be suitably controlled until the stored oxygen is consumed, and the oxidation/reduction reaction by the three-way catalyst can not be sufficiently used. Accordingly, until the stored oxygen is consumed, especially the amount of reaction to nitrogen oxide is lowered, and the nitrogen oxide in the exhaust gas is increased. In order to prevent this, it becomes necessary to change, when the fuel cut state is returned to a fuel supply state, the content of the air-fuel ratio control from that at the normal time.

As a technique for controlling the air-fuel ratio to suppress the increase of nitrogen oxide as stated above, there is a technique disclosed in, for example, patent document 1 (JP-A-05-26076 (pages 3 to 4, FIGS. 1 and 4)). The technique disclosed in this document is such that a main oxygen sensor is provided at the upstream side of a three-way catalyst, a sub-oxygen sensor is provided at the downstream side thereof, a feedback correction coefficient is increased or decreased according to a detection signal of oxygen concentration detected by the main oxygen sensor to feedback control an air-fuel ratio of an air-fuel mixture, a control constant used for the increase/decrease calculation of the feedback correction coefficient is changed according to a signal from the sub-oxygen sensor, and a deviation from the control center of the feedback control is corrected, in which the control constant is offset to a rich side during a period from the time point when the fuel cut is released to the time point when a signal of the sub-oxygen sensor is changed to a rich state, so that the consumption of oxygen stored in the three-way catalyst is accelerated, and the period when a purification rate of nitrogen oxide is deteriorated is shortened.

However, as in the technique disclosed in the prior art document, when the control constant is continuously offset to the rich side during a period until when the signal of the sub-oxygen sensor provided at the downstream side of the three-way catalyst is changed to the rich state after the fuel cut is released, although the air-fuel ratio in the three-way catalyst is made suitable and the nitrogen oxide can be purified, there occurs a state of excessive fuel supply, and carbon monoxide in the exhaust gas is increased. This state will be described below with reference to FIG. 4 of patent document 1.

When the fuel cut control is started, the output of the sub-oxygen sensor is shifted to the lean side, and lean output is continued. Since combustion is not performed during the period of the fuel cut, oxygen continues to be stored in the three-way catalyst, and is finally stored up to the limit of storage capacity. When the fuel cut is released, the control constant of the feedback is offset to the rich side during the period until when the signal of the sub-oxygen sensor is changed to the rich side, and the oxygen stored in the three-way catalyst is consumed, so that the output signal of the sub-oxygen sensor is changed from the lean side to the rich side. To this point, the description as shown in FIG. 4 of patent document 1 is appropriate, however, even if the control constant of the feedback is returned to a normal value in response to the shift of the signal of the sub-oxygen sensor to the rich side, the rich state of the air-fuel ratio continues for a specified time according to a time delay of the control, and since the stored oxygen of the three-way catalyst is wholly consumed, carbon monoxide or the like can not be reacted, and the carbon monoxide or the like in the exhaust gas is increased.

SUMMARY OF THE INVENTION

The present invention has been made to solve the problem as stated above, and an object thereof is to provide a control apparatus for an internal combustion engine, in which a fuel supply amount after the end of a fuel cut control is corrected and controlled so that oxygen stored in a three-way catalyst is quickly consumed, and all the stored oxygen is not consumed, and accordingly, the emission of nitrogen oxide can be suppressed without increasing the emission of carbon monoxide.

A control apparatus for an internal combustion engine according to the invention includes a three-way catalyst disposed in an exhaust system of an internal combustion engine and for performing purification of carbon monoxide and nitrogen oxide, a fuel cut control unit for temporarily performing a fuel supply stop when a fuel supply stop condition is established during an operation of the internal combustion engine, a fuel cut post-return fuel increasing correction unit for performing a fuel increasing correction during a specified period when a fuel supply stop state by the fuel cut control unit is returned to a fuel supply state, and a fuel increasing correction stop unit which compares an integrated value of an amount of air flowing into the three-way catalyst during a period of the fuel supply stop with an integrated value of an amount of air flowing into the three-way catalyst during the fuel increasing correction after a fuel supply return, and stops the fuel increasing correction of the fuel cut post-return fuel increasing correction unit when a comparison value reaches a specified value.

Besides, a control apparatus for an internal combustion engine includes a three-way catalyst disposed in an exhaust system of an internal combustion engine and for performing purification of carbon monoxide and nitrogen oxide, a fuel cut control unit for temporarily performing a fuel supply stop when a fuel supply stop condition is established during an operation of the internal combustion engine, a fuel cut post-return fuel increasing correction unit for performing a fuel increasing correction during a specified period when a fuel supply stop state by the fuel cut control unit is returned to a fuel supply state, and a fuel increasing correction stop unit which calculates an integrated value of an amount of oxygen flowing into the three-way catalyst during a period of the fuel supply stop, sets a target air-fuel ratio of an intake air amount to an increased and corrected fuel in the fuel increasing correction after a fuel supply return, calculates, from the target air-fuel ratio, an integrated value of an amount of oxygen consumed in the three-way catalyst after the fuel supply return, compares the integrated value of the amount of oxygen flowing into the three-way catalyst during the period of the fuel supply stop with the integrated value of the amount of oxygen consumed in the three-way catalyst after the fuel supply return, and stops the fuel increasing correction of the fuel cut post-return fuel increasing correction unit when this comparison value reaches a specified value.

According to the control apparatus for the internal combustion engine of the invention constructed as stated above, since the fuel increasing correction is performed after the return from the fuel cut, the oxygen stored in the three-way catalyst is quickly consumed, and the emission of harmful nitrogen oxide is suppressed. Further, the increased and corrected fuel is returned to a normal basic fuel injection amount according to the integrated value of the amount of air flowing into the three-way catalyst during the fuel cut period and the integrated value of the amount of oxygen consumed in the three-way catalyst after the return from the fuel cut. Accordingly, it is possible to make the return to the operation using the normal air-fuel ratio at a stage of a suitable oxygen amount before the amount of oxygen stored in the three-way catalyst becomes excessively small, and it becomes possible to suppress the excessive emission of carbon monoxide gas.

DETAILED DESCRIPTION OF THE INVENTION

Embodiment 1

Figure 1:
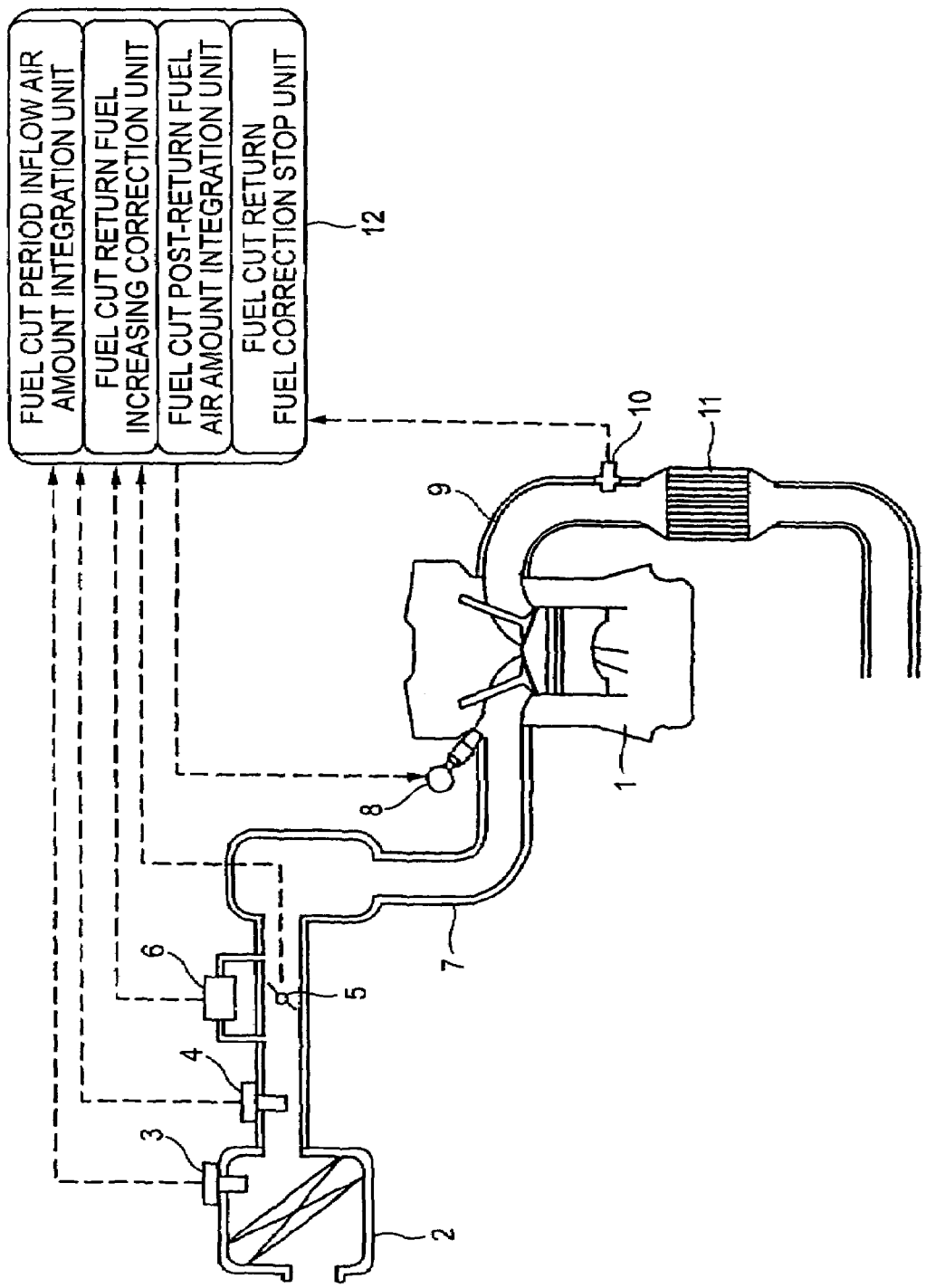
FIG. 1 is a schematic structural view for explaining a structure of a control apparatus for an internal combustion engine according to embodiment 1 of the invention.
Figure 2:
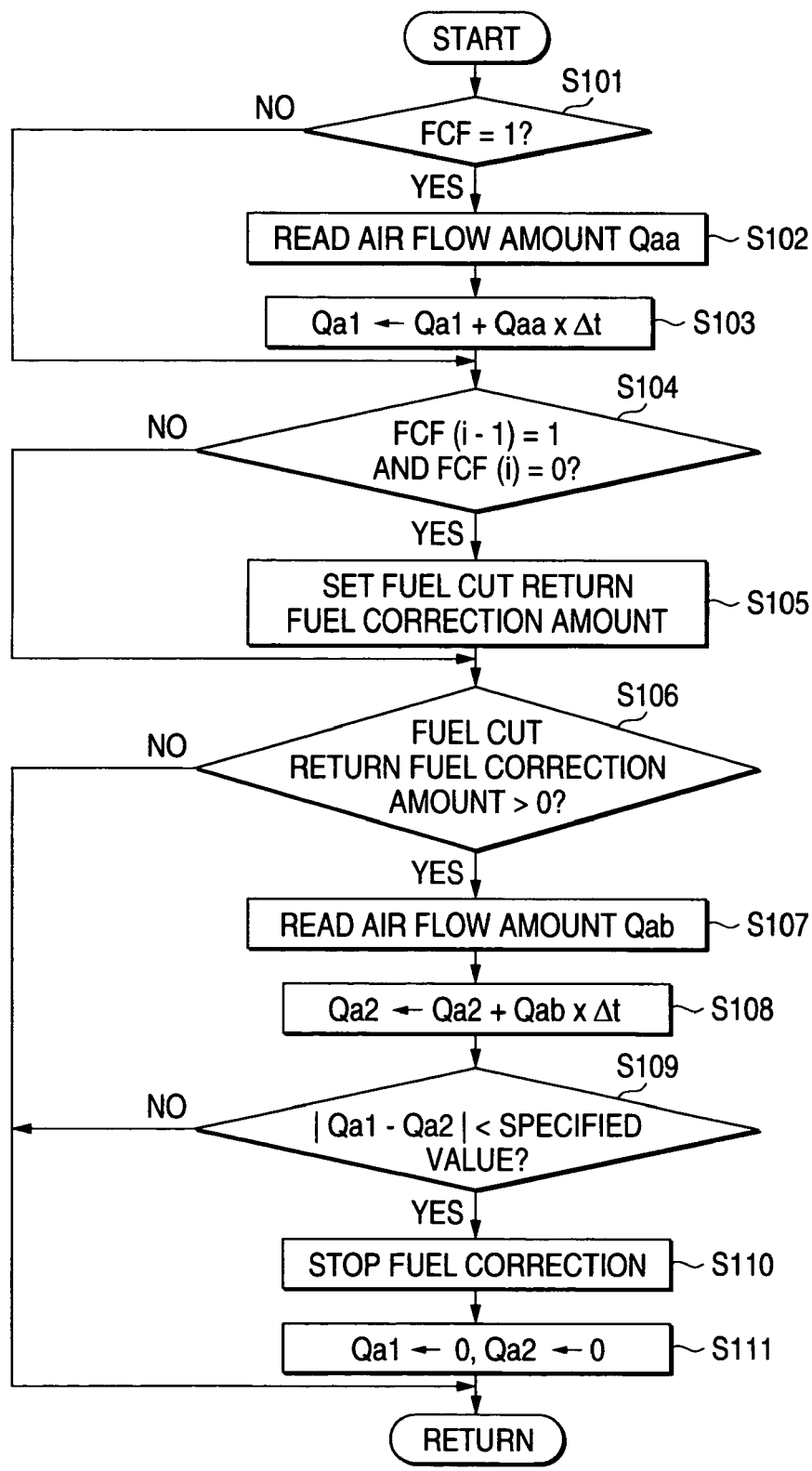
FIG. 2 is a flowchart for explaining an operation of the control apparatus for the internal combustion engine according to embodiment 1 of the invention.
Figure 3:
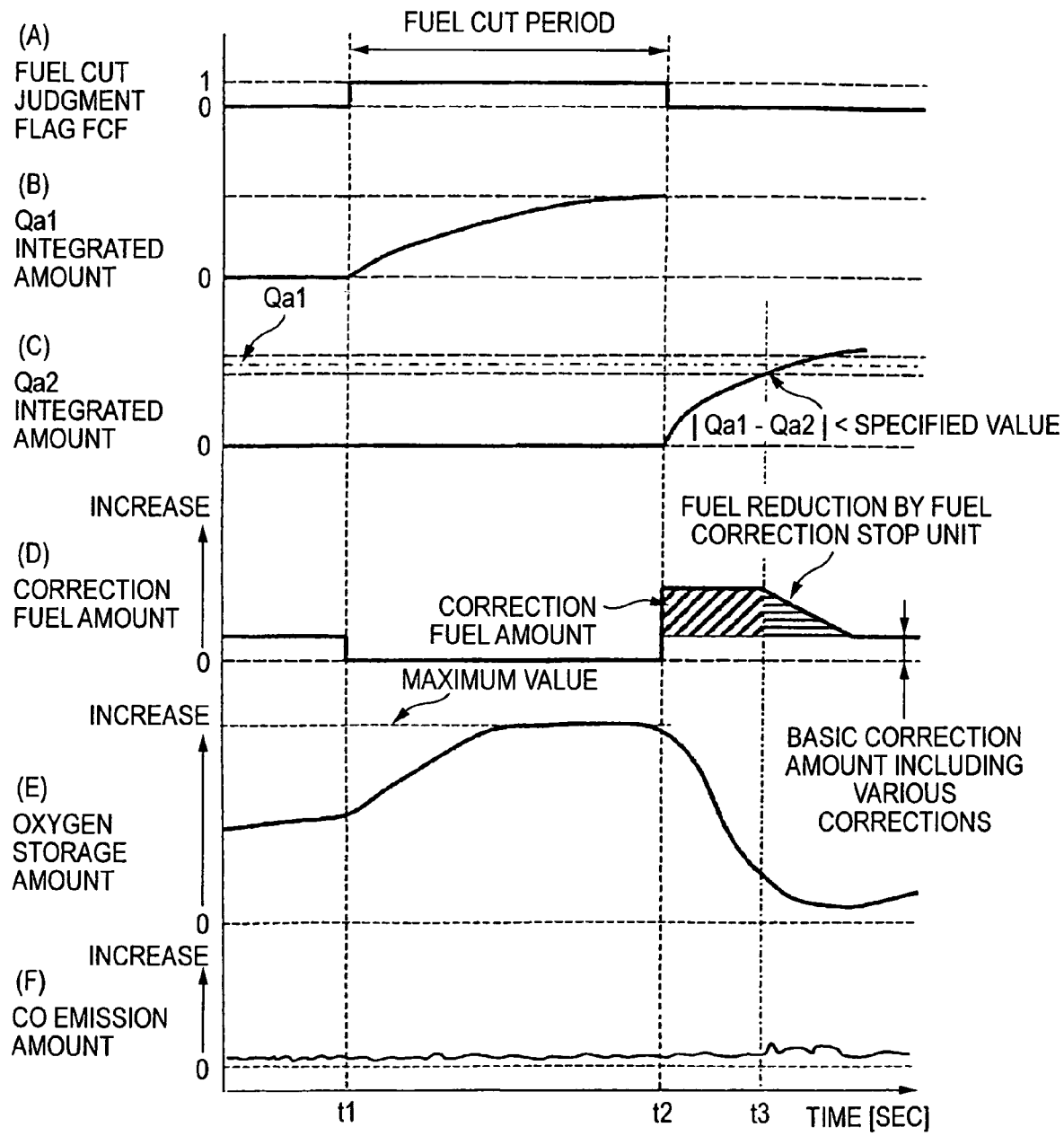
FIGS. 3A to 3F are time charts for explaining the operation of the control apparatus for the internal combustion engine according to embodiment 1 of the invention.

FIGS. 1 to 3F are for explaining a control apparatus for an internal combustion engine according to embodiment 1 of the invention, FIG. 1 is a schematic structural view of an internal combustion engine and its control system, FIG. 2 is a flowchart of a fuel increasing correction stop control after a return from fuel cut, and FIGS. 3A to 3F are time charts for explaining the fuel increasing correction stop control after the return from the fuel cut.

In FIG. 1, in an intake system of an internal combustion engine 1, from its upstream side, there are provided an air cleaner 2 for purifying intake air, an intake air temperature sensor 3 for measuring the temperature of the intake air, an air flow sensor 4 for measuring air intake per unit time, a throttle valve 5 for controlling the air intake, and an idle speed control valve (hereinafter referred to as an ISC valve) 6 provided to bypass the throttle valve 5 and for controlling idle rotation speed, and these respective parts are contained in an intake pipe 7. A fuel injection valve 8 is provided in the intake pipe 7 in the vicinity of an intake valve of the internal combustion engine 1, and the above respective parts constitute the intake system of the internal combustion engine 1.

An exhaust system of the internal combustion engine 1 is constructed of an exhaust pipe 9 for exhausting an exhaust gas after combustion, an oxygen sensor 10 provided in the exhaust pipe 9 and for detecting oxygen concentration in the exhaust gas, a three-way catalyst 11 provided at the downstream side of the oxygen sensor 10 and for purifying the exhaust gas, and the like. The oxygen sensor 10 outputs a signal indicating whether an air-fuel ratio is rich or lean according to the oxygen concentration in the exhaust gas, and the three-way catalyst 11 oxidizes or reduces the exhaust gas to perform purification and has the capability to store or release oxygen according to the oxygen concentration in the exhaust pipe 9. The oxygen sensor 10 may be one which outputs a linear signal according to the air-fuel ratio of the exhaust gas, or may be provided at an upstream side and a downstream side of the three-way catalyst 11.

A control unit (hereinafter referred to as an ECU) 12 performs various controls of the internal combustion engine 1, receives signals from the intake air temperature sensor 3, the air flow sensor 4, the throttle valve 5, the ISC valve 6, the oxygen sensor 10, a not-shown rotation speed sensor, and the like to judge the operation state of the internal combustion engine 1, calculates a basic injection time of the fuel injection valve 8, corrects the basic injection time according to various correction coefficients of feedback correction and the like, and calculates a driving time (fuel injection amount) of the fuel injection valve 8. Besides, the ECU has a function as a fuel cut post-return fuel increasing correction unit for supplying an increased and corrected fuel after a return (hereinafter referred to as "after a fuel cut return") from a fuel cut state to a fuel supply state, a function as a fuel correction stop unit for calculating the amount of air flowing into the three-way catalyst 11 during a period of the fuel cut and that during the fuel increasing correction, and returning the fuel increased and corrected after the fuel cut return to a normal basic supply amount according to integrated values of them, and a function as a fuel cut control unit for stopping fuel supply according to an operation state of the internal combustion engine 1, and for that purpose, the ECU 12 includes a memory function to store calculation results and the like.

The operation of the ECU 12 in the control apparatus for the internal combustion engine constructed as stated above according to embodiment 1 of the invention, especially the operation as the fuel correction stop unit will be described with reference to FIG. 2. A routine of a fuel cut post-return fuel increasing correction stop (stop of fuel increasing correction after a return to fuel supply) by this fuel correction stop unit is a routine operating on a main routine of a fuel control (including a fuel cut control corresponding to an operation state) to the internal combustion engine 1, and is a routine repeated at every specified time interval.

First, at step S101, it is judged whether the main routine is in a fuel cut period. This judgment is based on signals from a not-shown rotation speed sensor, the air flow sensor 4 and the like, and the judgment is made based on whether or not a set value of a judgment flag FCF is 1. When the main routine is in the fuel cut period, since the FCF is set to be 1 on the main routine of the fuel control, the procedure proceeds to step S102, and when the FCF is 0, since it is not in the fuel cut period, the procedure proceeds to step S104.

In the case where it is judged at step S101 that the main routine is in the fuel cut period, and the procedure proceeds to step S102, at step S102, an air amount Qaa flowing into the three-way catalyst 11 is calculated from signals of the air flow sensor 4 and the ISC valve 6, and at subsequent step S103, a value of the sum of the product of the inflow air amount Qaa and a calculation time interval $\Delta t$ at the time of execution of this routine and an integrated value Qa1 of the inflow air amount calculated at the immediately preceding routine, that is, the integrated value Qa1 of the inflow air amount is calculated and is updated. Although the fuel cut post-return fuel increasing correction stop routine is performed each time the fuel cut control is performed, at the time of execution of the last routine, as described later, the integrated value Qa1 of the inflow air amount is reset to 0 at step S111, in the first routine at the time of execution of the current routine, the initial value of Qa1 is 0, and after the current integrated value Qa1 is calculated anew, the procedure proceeds to step S104.

At step S104, it is judged whether the main routine is in immediately after the fuel cut return, and this judgment is made by comparison of the judgment flag FCF of the present routine and that of the immediately preceding routine. That is, when the judgment flag FCF(i−1) at the immediately preceding routine is 1, and the judgment flag FCF(i) at the present routine is 0, it is in immediately after the fuel cut return (that is, fuel supply resumption). When both the FCF(i−1) and the FCF(i) are 1, the fuel cut is going on, and when both the FCF(i−1) and the FCF(i) are 0, a time has passed since the fuel cut return. When this judgment indicates that the main routine is in immediately after the fuel cut return, a fuel cut return control including a judgment of a fuel cut post-return fuel increasing correction stop is performed at a subsequent step and the following.

When the procedure proceeds from step S103 to step S104, since the fuel cut is going on, both the FCF(i−1) and the FCF(i) are 1, and the procedure proceeds from step S104 to step S106. On the other hand, when the procedure proceeds from step S101 to step S104, since the FCF(i) is 0, in the case where the judgment flag FCF(i−1) at the immediately preceding routine is 0, a time has passed since the fuel cut return, and since the fuel cut post-return fuel increasing correction is being performed, the procedure proceeds to step S106. In the case where the judgment flag FCF(i−1) at the immediately preceding routine is 1, since the main routine is in immediately after the fuel cut return, the procedure proceeds to step S105. At step S105, a fuel correction amount by the fuel increasing correction control after the fuel cut return is set, the fuel increasing correction amount is added to a normal fuel supply amount, the fuel supply is performed from the fuel injection valve 8, and the fuel cut post-return fuel increasing correction control is started.

At step S106, it is judged whether or not a fuel cut post-return fuel increase is larger than 0. In the case where the fuel cut is going on at step S104, since the fuel cut post-return fuel increase is not performed, the judgment is NO, and the procedure proceeds to the return. On the other hand, in the case where a time has passed since the fuel cut return, the fuel cut post-return fuel increase is being performed, and since the fuel correction amount is set at step S105, the judgment is YES, and the procedure proceeds to step S107. Also at the time when the main routine is in immediately after the fuel cut return, and the procedure proceeds from step S105 to step S106, since the fuel correction amount is set at step S105, the judgment is YES and the procedure proceeds to step S107.

During the period when the fuel cut is performed, the procedure successively proceeds from step S101 to step S104, and since the main routine is not in immediately after the fuel cut return, the procedure proceeds from step S104 to step S106, and further, since the fuel cut post-return fuel increasing correction is not also performed, the procedure is returned from step S106, and this routine is repeated during the fuel cut execution period. Accordingly, during the fuel cut execution period, the amount of air flowing into the three-way catalyst 11 continues to be integrated.

As stated above, during the execution of the fuel cut post-return fuel increasing correction, the procedure proceeds from step S106 to step S107, and here, an air flow amount Qab after the fuel cut retune is calculated from the signals of the air flow sensor 4 and the throttle valve 5. When the calculation of this air flow amount Qab is completed, the procedure proceeds to step S108, and here, the air flow amount Qab and Qa2 as an integrated value of the air flow amount Qab calculated at the immediately preceding routine are added. That is, at this step, the air flow amount Qa2 is integrated. At the time of execution of the last routine, since the integrated value Qa2 of the air flow amount is reset to 0 at step S111, the initial value of Qa2 at the time of execution of the current routine is 0, and after the integrated value Qa2 of the air flow amount at the time of the current execution is calculated anew and is stored in the memory, the procedure proceeds to step S109.

At step S109, there is calculated a difference between the integrated value Qa1 of the inflow air amount integrated at step S103 during the fuel cut period and the integrated value Qa2 of the air flow amount integrated at step S108 after the fuel cut return, and this difference is compared with a specified value. This specified value is a value indicating the amount of air supplied after the fuel cut return with respect to the integrated value Qa1 of the inflow amount flowing into the three-way catalyst 11 and integrated during the fuel cut period at step S103, and is set to, for example, a value of 10% with respect to the difference between the integrated value Qa1 of the inflow air amount flowing into the three-way catalyst 11 during the fuel cut period and the integrated value Qa2 of the air flow amount flowing into the three-way catalyst 11 after the fuel cut return.

At step S109, in the case where the difference between Qa1 and Qa2 is smaller than the specified value, it is judged that the air amount and the amount of fuel introduced into the three-way catalyst 11 after the fuel cut return are sufficient for consuming the oxygen amount stored in the three-way catalyst 11 during the fuel cut, that is, it is judged that the oxygen stored in the three-way catalyst 11 is returned to a normal state, and in order not to make the oxygen stored in the three-way catalyst 11 null, the procedure proceeds to step S110, and a fuel cut post-return fuel increasing correction stop is executed. In the case where the difference between Qa1 and Qa2 is larger than the specified value, it is judged that the air amount and the amount of fuel introduced into the three-way catalyst 11 after the fuel cut return do not yet consume the oxygen amount stored in the three-way catalyst 11, the procedure is returned, and the fuel cut post-return fuel increasing correction control is continued.

The execution of the fuel cut post-return fuel increasing correction stop at step S110 resets the fuel correction amount of the fuel cut post-return fuel increasing correction control set at step S105 to 0, and by this, the fuel cut post-return fuel increasing correction control is completed. At subsequent step S111, the integrated value Qa1 of the inflow air amount during the fuel cut period and the integrated value Qa2 of the air flow amount after the fuel cut return are reset to 0, and the current fuel increasing correction control routine is ended.

In the case where the difference between Qa1 and Qa2 is larger than the specified value at step S109, the procedure is returned as set forth above, and the fuel cut post-return fuel increasing correction control is continued as set forth above. However, in the routine at this time, the judgment becomes NO at step S101 and the procedure proceeds to step S104, the judgment becomes NO also at step S104, and the procedure proceeds to step S106, and then step S106 to step S109 are executed to perform the calculation of the air flow amount Qab after the fuel cut return and the comparison of the integrated value, and the process is repeated until it is judged at step S109 that the difference between Qa1 and Qa2 is smaller than the specified value, and after it is judged that the oxygen stored in the three-way catalyst 11 is returned to the normal state, the fuel cut post-return fuel increasing correction stop is performed at step S110.

Subsequently, the fuel cut post-return fuel increasing correction stop control will be described with reference to time charts of FIGS. 3A to 3F. When the fuel cut control is executed, on the basis of the signals from the not-shown rotation speed sensor, the air flow sensor 4 and the like, the fuel cut judgment flag FCF is set to 1 at time t1, and the fuel cut control is started. During the fuel cut period, the inflow air amount Qaa flowing into the three-way catalyst 11 is read, and as shown in FIG. 3B, the integrated value Qa1 is integrated. However, during the execution of the fuel cut control, as set forth above, step S102 and step S103 are repeated, and the integrated value Qa1 continues to be integrated.

The fuel cut judgment flag FCF(i−1) at the immediately preceding routine is 1, and when the fuel cut judgment flag FCF(i) at the current routine becomes 0, the main routine is in immediately after the fuel cut return (t2 in the drawing), and the fuel cut post-return fuel increasing correction control is performed. As shown in FIG. 3D, the fuel injection amount is increased, and as shown in FIG. 3C, the air flow amount Qa2 flowing into the three-way catalyst 11 after the fuel cut return is integrated. When the difference between the inflow air amount Qa1 integrated during the fuel cut period and the air flow amount Qa2 integrated after the fuel cut return becomes the specified value or less at t3, since the oxygen storage amount in the three-way catalyst 11 stored until saturation is returned to the normal state as shown in FIG. 3E by the fuel increasing correction control after the fuel cut return, the fuel cut post-return fuel increasing correction control is stopped, and in order to keep the oxygen storage amount in the three-way catalyst 11 at a suitable value, as shown in FIG. 3D, the fuel increasing correction is gradually decreased, and is returned to the basic fuel injection amount.

As described above, according to the control apparatus for the internal combustion engine of embodiment 1 of this invention, the fuel increasing correction control is performed after the fuel cut return, and while the oxygen stored in three-way catalyst 11 is quickly consumed to suppress the emission of nitrogen oxide, the fuel increasing correction control after the fuel cut return is stopped according to the difference between the integrated value Qa1 of the air amount flowing into the three-way catalyst 11 during the fuel cut period and the air flow amount Qa2 flowing into the three-way catalyst 11 and integrated after the fuel cut return. Accordingly, the oxygen storage amount stored in the three-way catalyst 11 does not become excessively small but is kept at the suitable value, carbon monoxide is oxidized, and the emission of harmful material can be suppressed.

Embodiment 2

Figure 4:
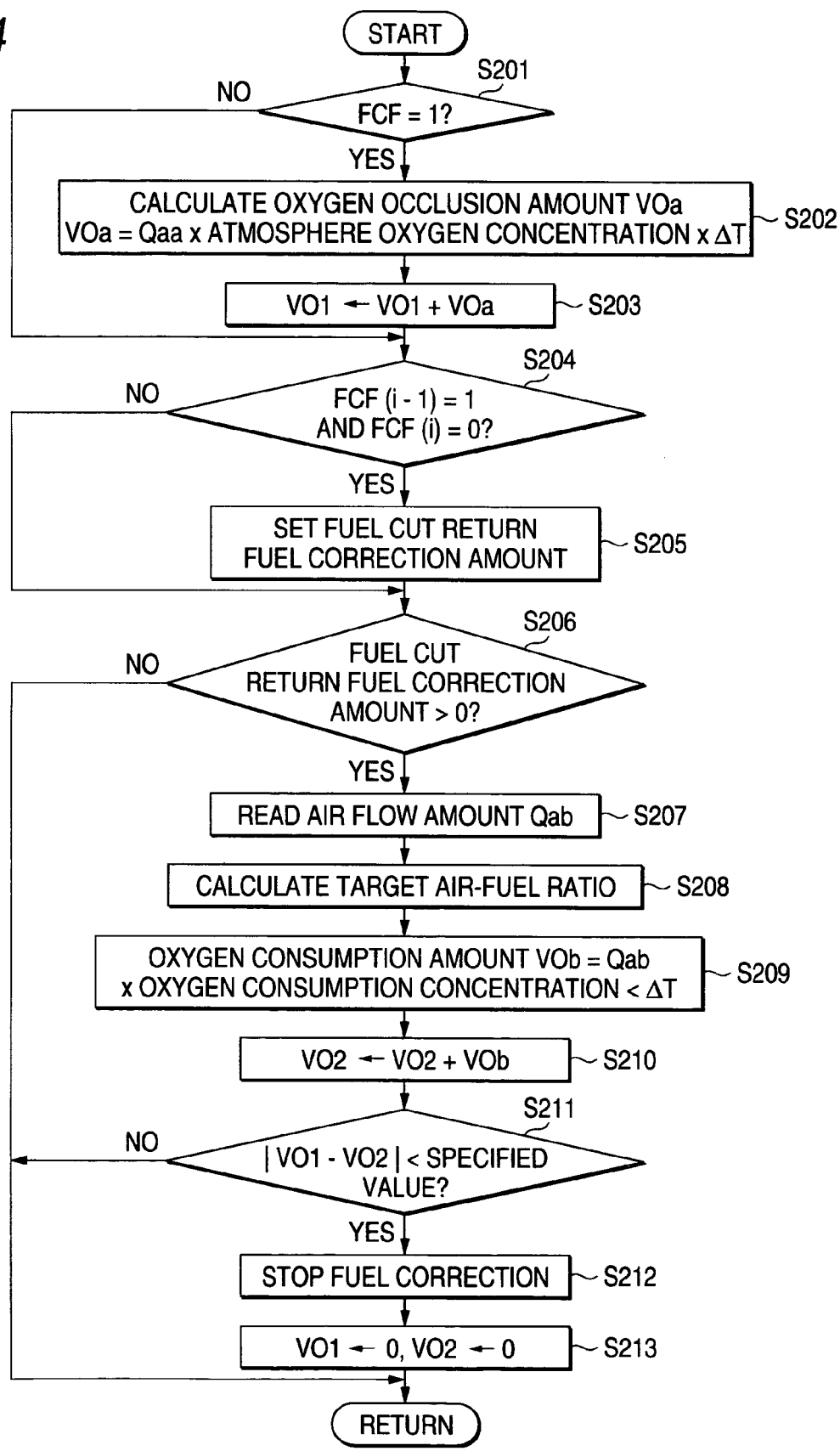
FIG. 4 is a flowchart for explaining an operation of a control apparatus for an internal combustion engine according to embodiment 2 of the invention.
Figure 5:
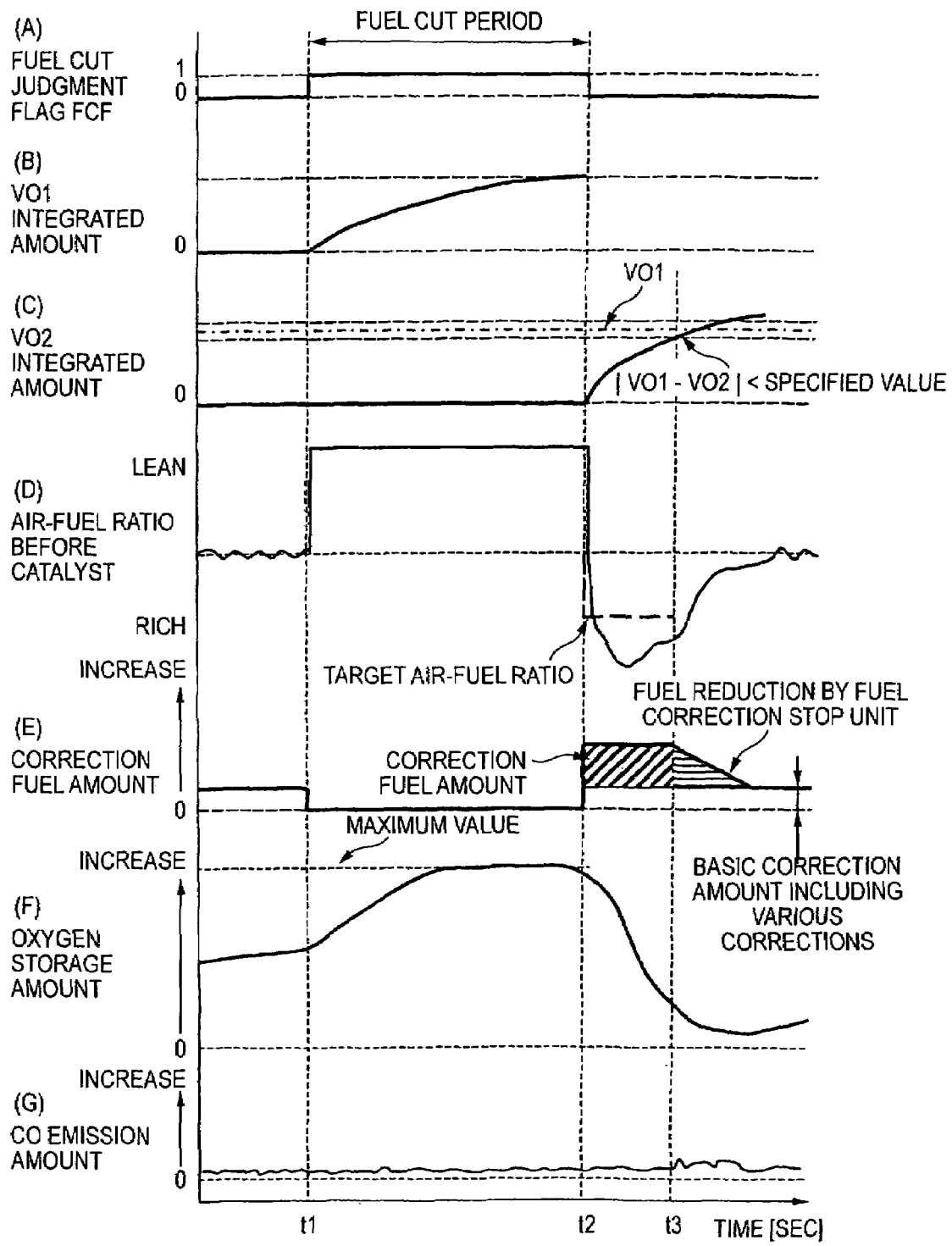
FIGS. 5A to 5G are time charts for explaining the operation of the control apparatus for the internal combustion engine according to embodiment 2 of the invention.
Figure 6:
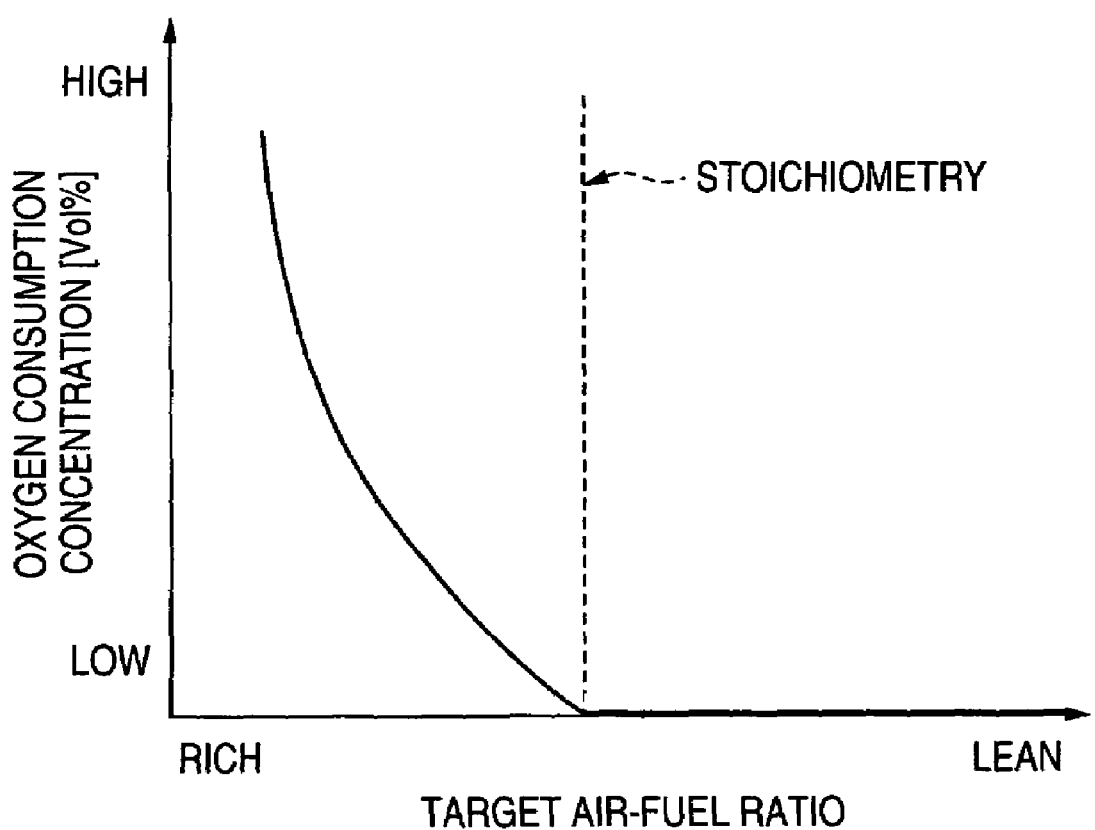
FIG. 6 is an explanatory view showing a relation between an air-fuel ratio and an oxygen consumption amount in the control apparatus for the internal combustion engine according to embodiment 2 of the invention.

FIGS. 4 to 6 are for explaining a control apparatus for an internal combustion engine according to embodiment 2 of this invention, FIG. 4 is a flowchart for explaining a stop of a fuel correction control after a return from fuel cut, FIGS. 5A to 5G are flowcharts for explaining a fuel correction stop control after the return from the fuel cut, and FIG. 6 is an explanatory view showing a relation between an air-fuel ratio and an oxygen consumption amount. A structure of an internal combustion engine and a control system is the same as that of FIG. 1 described in embodiment 1. In the control apparatus for the internal combustion engine according to this embodiment, as shown in FIG. 4, a control to obtain an oxygen amount is performed during a fuel cut period of a control routine, and a control to calculate a target air-fuel ratio and a calculation of an oxygen consumption amount consumed by a three-way catalyst are performed after the fuel cut return.

The operation of an ECU, especially the operation as a fuel correction stop unit will be described with reference to FIG. 4. A routine of a fuel cut post-return fuel increasing correction stop by the fuel correction stop unit is also a routine operating on a main routine of a fuel control to the internal combustion engine 1, and is a routine repeated at specified time intervals. When the routine is started, at step S201, it is judged whether or not a fuel cut control is being performed. This judgment is similar to that of the case of embodiment 1, and the judgment is made based on whether or not a set value of a judgment flag FCF is 1. Here, in the case where the fuel cut period is occurring, since the FCF is set to be 1, the procedure proceeds to step S202, and when the FCF is 0, since the fuel cut period is not occurring, the procedure proceeds to step S204.

In the case where it is judged at step S201 that the fuel cut period is occurring, and the procedure proceed to step S202, here, the signals of the air flow sensor 4 and the ISC valve 6 are inputted, the ECU 12 carries out an operation, calculates an air amount Qaa flowing into the three-way catalyst 11, and further calculates an oxygen occlusion amount VOa in the three-way catalyst 11. Since fuel supply is not performed during the fuel cut period, combustion is not performed, and therefore, the air introduced into a cylinder is exhausted as it is, the oxygen concentration of the exhaust air is the same as the oxygen concentration (about 21%) in the atmosphere, and oxygen with this concentration is stored in the three-way catalyst 11. Accordingly, the oxygen occlusion amount VOa is calculated by the product of the calculated inflow air amount Qaa, the oxygen concentration in the atmosphere, and the calculation time interval $\Delta t$ at the time of execution of the routine.

After the oxygen occlusion amount VOa is calculated, the procedure proceeds to step S203, and the calculated oxygen occlusion amount VOa is added to an integrated value VO1 of the oxygen occlusion amount calculated at the immediately preceding routine. At the first time in the current execution of the fuel cut post-return fuel increasing correction stop routine, since the integrated value VO1 of the oxygen occlusion amount was reset to 0 at step S213 when the last routine was executed, the initial value of the oxygen occlusion amount integrated value VO1 is 0, and after the integrated value VO1 of the current oxygen occlusion amount is calculated anew, it is stored in the memory, and the procedure proceeds to step S204, The procedure proceeds to step S204 when the FCF is 0 at step S201 or after the oxygen occlusion amount is integrated at step S203, and at this step, it is judged whether or not the main routine is in immediately after the fuel cut return. Similarly to the case of embodiment 1, this judgment is performed based on the comparison between the judgment flag FCF of the current routine and that of the immediately preceding routine. That is, when the judgment flag FCF(i-1) of the immediately preceding routine is 1, and the judgment flag FCF(i) of the current routine is 0, the main routine is in immediately after the fuel cut return. When both the FCF (i-1) and the FCF(i) are 1, the fuel cut is going on, and when both the FCF(i-1) and the FCF(i) are 0, a time has passed since the fuel cut return.

When the procedure proceeds from step S203 to step S204, since the fuel cut control is being performed, both the FCF(i-1) and the FCF(i) are 1, the judgment becomes NO, and the procedure proceeds to step S206. When the procedure proceeds from step S201 to step S204, since the judgment flag FCF(i) is 0, in the case where the judgment flag FCF(i-1) at the immediately preceding routine is 0, the time has passed since the fuel cut return, and since the fuel cut post-return fuel increasing correction is being performed, the procedure proceeds to step S206. In the case where the judgment flag FCF(i-1) at the immediately preceding routine is 1, since the main routine is in immediately after the fuel cut return, the procedure proceeds to step S205.

When the main routine is in immediately after the fuel cut return, at step S205, the fuel correction amount is set by the fuel cut post-return fuel increasing correction control, the fuel correction amount is added to a normal fuel supply amount, the fuel supply is performed from the fuel injection valve 8, the fuel cut post-return fuel increasing correction control is started, and the procedure proceeds to step 206. At step 206, it is judged whether or not the fuel cut post-return fuel correction amount is larger than 0. In the case where the procedure proceeds from step S205 to step 206, the main routine is in immediately after the fuel cut return, and since the fuel cut post-return fuel correction amount is the set value, the judgment becomes YES, and the procedure proceeds to step 207.

In the case where the fuel cut control is being performed at step 204, the judgment becomes NO, and the procedure proceeds to step 206. In this case, since the fuel cut post-return fuel increasing correction is not performed, the judgment becomes NO also at step 206, and the procedure is returned. In the case where it is judged at step 204 that the time has passed since the fuel cut return, and the procedure proceeds to step 206, since the fuel cut post-return fuel increasing correction is being performed, the judgment becomes YES at step 206, and the procedure proceeds to step 207. During the period of the fuel cut, the procedure successively proceeds from step 202 to step 204, and at step 204, since the main routine is not in immediately after the fuel cut return, the judgment becomes NO, and also at step 206, since the fuel increasing correction is not being performed, the judgment becomes NO, the respective steps from step 201 to step 204 and step 206 are repeated, and during the period of the fuel cut, the oxygen occlusion amount VO1 stored in the three-way catalyst 11 continues to be integrated.

In the case where the fuel cut post-return fuel correction amount is larger than 0 at step 206, that is, in the case where the fuel cut post-return fuel increasing correction control is being performed, the procedure proceeds to step S207 as set forth above, and here, the air flow amount Qab flowing into the three-way catalyst 11 after the fuel cut return is calculated from signals of the air flow sensor 4 and the throttle valve 5. After the air flow amount Qab is calculated, the procedure proceeds to step S208, and the target air-fuel ratio after the fuel cut return is set. This target air-fuel ratio is the air-fuel ratio supplied, as a reducing agent for quickly consuming the oxygen stored in the three-way catalyst 11 during the fuel cut period, to the three-way catalyst 11, and is variously changed according to the operation state of the internal combustion engine 1 after the fuel cut return.

At subsequent step S209, an oxygen consumption amount VOb is obtained from the air flow amount Qab calculated at step S207 and the target air-fuel ratio (oxygen consumption concentration) after the fuel cut return set at step S208. This oxygen consumption amount VOb indicates the amount of the oxygen consumed by the fuel increasing correction after the fuel cut return in the oxygen stored in the three-way catalyst 11 during the fuel cut period. Since the fuel is made excessive by the execution of the fuel cut post-return fuel increasing correction control, carbon monoxide and hydrocarbon are increased in the exhaust gas from the cylinder. However, the carbon monoxide and hydrocarbon are combined with the oxygen stored in the three-way catalyst 11 so that they are converted into carbon dioxide and water, and the oxygen stored in the three-way catalyst 11 is consumed. The amount of the consumed oxygen can be calculated from the ratio of the fuel increase performed after the fuel cut return to the intake air amount, that is, from the target air-fuel ratio.

That is, it is possible to calculate the amount of the consumed oxygen from the target air-fuel ratio set after the fuel cut return and the air amount flowing into the three-way catalyst 11 after the fuel cut return, and the target air-fuel ratio and the oxygen consumption concentration consumed in the three-way catalyst 11 have a relation as shown in FIG. 6. As the target air-fuel ratio becomes rich, the oxygen consumption concentration is increased. On the other hand, at a lean side with respect to stoichiometry, that is, the theoretical air-fuel ratio, the oxygen consumption concentration becomes remarkably small. At step S209, the oxygen consumption amount VOb consumed by the three-way catalyst 11 after the fuel cut return is calculated from the target air-fuel ratio calculated at step S208 by using the relation of FIG. 6. The calculation method is the product of the air amount Qab flowing into the three-way catalyst 11 after the fuel cut return, the oxygen consumption concentration obtained from FIG. 6, and the calculation time interval Δt of this routine.

At subsequent step S210, the oxygen consumption amount VOb consumed by the three-way catalyst 11 and the integrated value VO2 of the oxygen consumption amount calculated at step S210 in the immediately preceding routine and consumed in the three-way catalyst 11 are added to obtain a new integrated value VO2. With respect to the initial value of the integrated value VO2, similarly to the above case of the integrated value VO1 of the oxygen occlusion amount, the integrated value has been reset to 0 at step S213 in the last execution of this routine, and at the first time in the current execution, the integrated value VO2 of the current oxygen consumption amount is calculated anew, and is stored in the memory. At the second routine and the following in the current routine execution, the integrated value VO2 stored in the immediately preceding routine is read, VOb calculated at step S209 is added thereto, and the integrated value VO2 in the memory is updated.

At subsequent step S211, a difference between the integrated value VO1 of the oxygen occlusion amount flowing into the three-way catalyst 11 during the fuel cut period calculated at step S202 and S203 and the integrated value VO2 of the oxygen consumption amount consumed in the three-way catalyst 11 after the fuel cut return at step S209 and S210 are compared with a specified value. This specified value indicates the amount of the oxygen consumed by the fuel increasing correction control after the fuel cut return in the oxygen stored in the three-way catalyst 11 during the fuel cut period, and is set to, for example, 5% of the difference between the oxygen occlusion amount stored during the fuel cut period and the oxygen consumption amount consumed after the fuel cut return.

In the case where the difference between VO1 and VO2 is smaller than the specified value at step S211, the procedure proceeds to step S212, the oxygen stored in the three-way catalyst 11 during the fuel cut period is consumed by the fuel increasing correction control performed after the fuel cut return, and the storage oxygen amount in the three-way catalyst 11 is returned to a normal state. Accordingly, the fuel increasing correction is stopped, the integrated value VO1 of the oxygen occlusion amount integrated during the fuel cut period and the integrated value VO2 of the oxygen consumption amount after the fuel cut return are reset to 0 at step S213, and the procedure is returned. In the case where the difference between VO1 and VO2 is larger than the specified value at step S211, the procedure is returned, the fuel increasing correction is continued, and the repetition of the routine is continued until the difference between VO1 and VO2 becomes smaller than the specified value.

Subsequently, the control operation will be described with reference to time charts of FIGS. 5A to 5G. When the fuel cut control is started, the fuel cut judgment flag FCF is set to 1 at t1 of the drawing by the signals of the rotation speed sensor and the air flow sensor 4, the air amount Qaa flowing into the three-way catalyst 11 during the fuel cut period is calculated, and the oxygen occlusion amount VO1 is calculated. During the period when the fuel cut control is performed, the FCF is always 1, and the fuel increasing correction is not performed, and therefore, step S202 and S203 are repeated in the flowchart of FIG. 4, the oxygen occlusion amount VO1 continues to be integrated, and the air-fuel ratio at the upstream side of the three-way catalyst 11 is shifted to the lean side as shown in FIG. 5D.

When the fuel cut control is ended at t2 of the drawing, the fuel cut judgment flag FCF is reset to 0, and as shown in FIG. 5E, the fuel cut post-return fuel increasing correction control is performed, the fuel injection amount is increased and corrected, the air-fuel ratio at the upstream side of the three-way catalyst 11 is shifted to the rich side as shown in FIG. 5D, and the integrated value VO2 of the oxygen consumption amount consumed by the three-way catalyst 11 by the fuel increasing correction is calculated as shown in FIG. 5C. The VO2 continues to be integrated until the difference between the integrated value VO1 of the oxygen occlusion amount flowing into the three-way catalyst 11 during the fuel cut period and the integration value VO2 of the oxygen consumption amount consumed by the three-way catalyst 11 after the fuel cut return becomes the specified value or less. When the difference between the integrated value VO1 and the integrated value VO2 becomes the specified value or less at t3 of the drawing, the fuel cut post-return fuel increasing correction control is stopped, the increased fuel correction amount is gradually decreased, and is returned to the basic fuel injection amount.

As stated above, as the stop judgment of the fuel cut post-return fuel increasing correction in this embodiment, in addition to the integrated value of the air amount after the fuel cut return, the target air-fuel ratio in the fuel cut post-return fuel increasing correction control is added, the oxygen consumption amount consumed by the three-way catalyst 11 after the fuel cut return is calculated, and the stop of the fuel cut post-return fuel increasing correction is judged from the oxygen amount stored in the three-way catalyst 11 during the fuel cut period and the oxygen amount consumed by the three-way catalyst 11 after the fuel cut return. Accordingly, the control apparatus for the internal combustion engine can be obtained in which the oxygen storage amount stored in the three-way catalyst 11 does not become excessively small, but is kept at a suitable value, and while the emission of carbon monoxide is suppressed to the minimum as shown in FIG. 5G, the emission of nitrogen oxide can be suppressed with high accuracy.

The control apparatus for the internal combustion engine of the invention is applied to the internal combustion engine which is mounted in a vehicle or the like and cuts fuel supply at the time of declaration or the like to improve an oxygen consumption amount and deceleration characteristics.

What is claimed is:

1. A control apparatus for an internal combustion engine, comprising:
    a three-way catalyst disposed in an exhaust system of an internal combustion engine and for performing purification of carbon monoxide and nitrogen oxide;
    a fuel cut control unit for temporarily performing a fuel supply stop when a fuel supply stop condition is established during an operation of the internal combustion engine;
    a fuel cut post-return fuel increasing correction unit for performing a fuel increasing correction during a specified period when a fuel supply stop state by the fuel cut control unit is returned to a fuel supply state; and
    a fuel increasing correction stop unit which compares an integrated value of an amount of air flowing into the three-way catalyst during a period of the fuel supply stop with an integrated value of an amount of air flowing into the three-way catalyst during the fuel increasing correction after a fuel supply return, and stops the fuel increasing correction of the fuel cut post-return fuel increasing correction unit when a comparison value reaches a specified value.

2. A control apparatus for an internal combustion engine, comprising:
    a three-way catalyst disposed in an exhaust system of an internal combustion engine and for performing purification of carbon monoxide and nitrogen oxide;
    a fuel cut control unit for temporarily performing a fuel supply stop when a fuel supply stop condition is established during an operation of the internal combustion engine;
    a fuel cut post-return fuel increasing correction unit for performing a fuel increasing correction during a specified period when a fuel supply stop state by the fuel cut control unit is returned to a fuel supply state; and a fuel increasing correction stop unit which calculates an integrated value of an amount of oxygen flowing into the three-way catalyst during a period of the fuel supply stop, sets a target air-fuel ratio of an intake air amount to an increased and corrected fuel in the fuel increasing correction after a fuel supply return, calculates, from the target air-fuel ratio, an integrated value of an amount of oxygen consumed in the three-way catalyst after the fuel supply return, compares the integrated value of the amount of oxygen flowing into the three-way catalyst during the period of the fuel supply stop with the integrated value of the amount of oxygen consumed in the three-way catalyst after the fuel supply return, and stops the fuel increasing correction of the fuel cut post-return fuel increasing correction unit when the comparison value reaches a specified value.

* * * * *